US008613102B2

(12) United States Patent
Nath

(10) Patent No.: US 8,613,102 B2
(45) Date of Patent: Dec. 17, 2013

(54) METHOD AND SYSTEM FOR PROVIDING DOCUMENT RETENTION USING CRYPTOGRAPHY

(75) Inventor: Satyajit Nath, Cupertino, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 1608 days.

(21) Appl. No.: 10/815,251

(22) Filed: Mar. 30, 2004

(65) Prior Publication Data

US 2005/0223242 A1 Oct. 6, 2005

(51) Int. Cl.
*G06F 7/04* (2006.01)

(52) U.S. Cl.
USPC ............. 726/27; 713/158; 713/168; 713/171; 713/193

(58) Field of Classification Search
USPC ................................. 713/193, 168, 171, 158
See application file for complete search history.

(56) References Cited

U.S. PATENT DOCUMENTS

| 4,203,166 | A | | 5/1980 | Eshram et al. |
| 4,734,568 | A | | 3/1988 | Watanabe |
| 4,757,533 | A | | 7/1988 | Allen et al. |
| 4,796,220 | A | * | 1/1989 | Wolfe ............... 705/56 |
| 4,799,258 | A | | 1/1989 | Davies |
| 4,827,508 | A | * | 5/1989 | Shear ............... 705/53 |
| 4,888,800 | A | | 12/1989 | Marshall et al. |
| 4,972,472 | A | | 11/1990 | Brown et al. |
| 5,032,979 | A | | 7/1991 | Hecht et al. |
| 5,052,040 | A | | 9/1991 | Preston et al. |
| 5,058,164 | A | | 10/1991 | Elmer et al. |
| 5,144,660 | A | | 9/1992 | Rose |
| 5,204,897 | A | | 4/1993 | Wyman |
| 5,220,657 | A | | 6/1993 | Bly et al. |
| 5,247,575 | A | | 9/1993 | Sprague et al. |
| 5,276,735 | A | | 1/1994 | Boebert et al. |

(Continued)

FOREIGN PATENT DOCUMENTS

| EP | 0 672 991 A2 | 9/1995 |
| EP | 0 674 253 A1 | 9/1995 |

(Continued)

OTHER PUBLICATIONS

Wikipedia, "Remote procedure call," web page indexed by archive. org on Feb. 16, 2004; downloaded from http://web.archive.org/web/20040216160749/http://en.wikipedia.org/wiki/Remote_procedure_call on Nov. 19, 2010.*

(Continued)

*Primary Examiner* — Kaveh Abrishamkar
(74) *Attorney, Agent, or Firm* — Sterne, Kessler, Goldstein & Fox P.L.L.C.

(57) ABSTRACT

Techniques for utilizing security criteria to implement document retention for electronic documents are disclosed. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

26 Claims, 12 Drawing Sheets

(56) References Cited

U.S. PATENT DOCUMENTS

| | | |
|---|---|---|
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |
| 5,414,852 A | 5/1995 | Kramer et al. |
| 5,495,533 A | 2/1996 | Linehan et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,655,119 A | 8/1997 | Davy |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,684,987 A | 11/1997 | Mamiya et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A | 2/1998 | Stefik |
| 5,717,755 A | 2/1998 | Shanton |
| 5,720,033 A | 2/1998 | Deo |
| 5,729,734 A | 3/1998 | Parker et al. |
| 5,745,573 A | 4/1998 | Lipner et al. |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,778,065 A | 7/1998 | Hauser et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson, Jr. |
| 5,835,592 A | 11/1998 | Chang et al. |
| 5,835,601 A | 11/1998 | Shimbo et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schnek et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,987,440 A | 11/1999 | O'Neil et al. |
| 5,991,879 A | 11/1999 | Still |
| 5,999,907 A | 12/1999 | Donner |
| 6,014,730 A | 1/2000 | Ohtsu |
| 6,023,506 A | 2/2000 | Ote et al. |
| 6,032,216 A | 2/2000 | Schmuck et al. |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,957 A | 5/2000 | Richards |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,158,010 A | 12/2000 | Moriconi et al. |
| 6,161,139 A | 12/2000 | Win et al. |
| 6,182,142 B1 | 1/2001 | Win et al. |
| 6,185,612 B1 * | 2/2001 | Jensen et al. ................... 709/223 |
| 6,185,684 B1 | 2/2001 | Pravetz et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,873 B1 | 6/2001 | Richard et al. |
| 6,253,193 B1 | 6/2001 | Ginter et al. |
| 6,260,141 B1 | 7/2001 | Park |
| 6,263,348 B1 | 7/2001 | Kathrow et al. |
| 6,272,631 B1 | 8/2001 | Thomlinson et al. |
| 6,272,632 B1 | 8/2001 | Carmen et al. |
| 6,282,649 B1 | 8/2001 | Lambert et al. |
| 6,289,450 B1 * | 9/2001 | Pensak et al. ................. 713/167 |
| 6,292,895 B1 | 9/2001 | Baltzley |
| 6,292,899 B1 | 9/2001 | McBride |
| 6,295,361 B1 | 9/2001 | Kadansky et al. |
| 6,301,614 B1 | 10/2001 | Najork et al. |
| 6,308,256 B1 | 10/2001 | Folmsbee |
| 6,314,409 B2 | 11/2001 | Schnek et al. |
| 6,317,777 B1 | 11/2001 | Skarbo et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons, Jr. et al. |
| 6,351,813 B1 | 2/2002 | Mooney et al. |
| 6,353,859 B1 * | 3/2002 | McKeehan et al. ........... 719/315 |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,421,714 B1 | 7/2002 | Rai et al. |
| 6,442,688 B1 | 8/2002 | Moses et al. |
| 6,442,695 B1 | 8/2002 | Dutcher et al. |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |

(56) References Cited

U.S. PATENT DOCUMENTS

| | | |
|---|---|---|
| 6,611,599 B2 | 8/2003 | Natarajan |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko, Sr. et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B2 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 | 5/2006 | Kobayashi et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,107,269 B2 | 9/2006 | Arlein et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,249,251 B2* | 7/2007 | Todd et al. ............... 713/1 |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Cannata et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,380,120 B1 | 5/2008 | Garcia |
| 7,383,586 B2 | 6/2008 | Cross et al. |
| 7,386,529 B2 | 6/2008 | Kiessig et al. |
| 2001/0011254 A1 | 8/2001 | Clark |
| 2001/0021926 A1 | 9/2001 | Schnek et al. |
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |

(56) References Cited

U.S. PATENT DOCUMENTS

| | | |
|---|---|---|
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0154381 A1 | 8/2003 | Ouye |
| 2003/0159066 A1 | 8/2003 | Staw et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1 | 7/2006 | Inoue et al. |
| 2006/0230437 A1 | 10/2006 | Boyer et al. |
| 2007/0006214 A1 | 1/2007 | Dubal et al. |

FOREIGN PATENT DOCUMENTS

| | | |
|---|---|---|
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107 504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Expiration Mechanism for Chipcards, IBM Technical Disclosure Bulletin, Oct. 1, 2001, UK.

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

"Inside Encrypting file system," Part 1, from MSDN Oct. 2001 version, exact publication date is unknown but believed prior to Dec. 12, 2001.

"Inside Encrypting file system," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS work," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS" from MSDN Oct. 2001 version, exact publication date is unknown but believed prior to Dec. 12, 2001.

"Windows 2000 EFS" in the Apr. 1999 issue of Windows NT magazine.

(56) References Cited

OTHER PUBLICATIONS

Microsoft Windows 200 server. Windows 2000 Group Policy White Paper, 2000.
Symantec. Norton Antivirus Corporate Edition Implementation Guide, 1999.
Crocker, Steven Toye, "Multi-level cryptographic transformations for securing digital assets,"U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment,"U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities" inventor Vainstein, Dec. 20, 2002, 39 pgs.
U.S. Appl. No. 10/286,524, entitled "Security system that uses indirect password-based encryption," inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/642,041, entitled "Method and system for fault-tolerant transfer of files across a network" inventor Kenrich, Aug. 15, 2003, 32 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for identifying compounds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 10/295,363, entitled "Security System Using Indirect Key Generation from Access Rules and Methods Therefor," inventor Vainstein, Nov. 15, 2002, 70 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1-4.
Adobe Acrobat Security Settings, Acrobat 7.0, Nov. 15, 2004, pp. 1-4.
"Security Options". Dec. 20, 2001. DC & Co. pp. 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Boneh et al., "Hierarchical Identity Based Encryption with Constant Size Ciphertext," Advances in Cryptology-EUROCRYPT 2005, vol. 3493, Jun. 20, 2005, pgs. 440-456.
Boneh et al., "IBE Secure E-mail,"Standford University, Apr. 8, 2002, http://crypto.standford.edu/ibe/.

* cited by examiner

METHOD AND SYSTEM FOR PROVIDING DOCUMENT RETENTION USING CRYPTOGRAPHY

CROSS-REFERENCE TO RELATED APPLICATIONS

This application is related to: (i) U.S. patent application Ser. No. 10/815,229, filed concurrently herewith, and entitled "METHOD AND SYSTEM FOR PROVIDING CRYPTOGRAPIC DOCUMENT RETENTION WITH OFF-LINE ACCESS," which is hereby incorporated herein by reference; (ii) U.S. patent application Ser. No. 10/206,737, filed Jul. 26, 2002, and entitled "METHOD AND SYSTEM FOR UPDATING KEYS IN A DISTRIBUTED SECURITY SYSTEM," which is hereby incorporated herein by reference; (iii) U.S. patent application Ser. No. 10/676,850, filed Sep. 30, 2003, and entitled "METHOD AND SYSTEM FOR SECURING DIGITAL ASSETS USING TIME-BASED SECURITY CRITERIA," which is hereby incorporated herein by reference; (iv) U.S. patent application Ser. No. 10/405,587, filed Apr. 1, 2003, and entitled "METHOD AND SYSTEM FOR SECURING DIGITAL ASSETS USING CONTENT TYPE DESIGNATIONS," which is hereby incorporated herein by reference; (v) U.S. patent application Ser. No.: 10/246,079, filed Sep. 17, 2002, and entitled "METHOD AND APPARATUS FOR GENERATING KEYS FROM ACCESS RULES IN A DECENTRALIZED MANNER AND METHODS THEREFOR," which is hereby incorporated herein by reference; (vi) U.S. patent application Ser. No.: 10/186,203, filed Jun. 26, 2002, and entitled "METHOD AND SYSTEM FOR IMPLEMENTING CHANGES TO SECURITY POLICIES IN A DISTRIBUTED SECURITY SYSTEM," which is hereby incorporated herein by reference; (vii) U.S. patent application Ser. No.: 10/159,537, filed May 5, 2002, and entitled "METHOD AND APPARATUS FOR SECURING DIGITAL ASSETS," which is hereby incorporated herein by reference; and (viii) U.S. patent application Ser. No.: 10/127,109, filed Apr. 22, 2002, and entitled "EVALUATION OF ACCESS RIGHTS TO SECURED DIGITAL ASSETS," which is hereby incorporated herein by reference.

BACKGROUND OF THE INVENTION

1. Field of the Invention

The present invention relates to security systems for data and, more particularly, to security systems that protect electronic files in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept information traveling across the Internet and even gain access to proprietary information stored in computers that interconnect to the Internet.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day millions of people interact electronically, whether it is through e-mail, e-commerce (business conducted over the Internet), ATM machines, or cellular phones. The perpetual increase of information transmitted electronically has led to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the encrypted data after using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of networks, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs) and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Consequently, various cryptographic means are deployed to provide restricted access to electronic data (namely, electronic documents) in security systems.

Besides restricting access to electronic documents, businesses and organizations also face the difficulty of implementing document retention for electronic documents. In today's heavily regulated business environment, various electronic documents need to be retained for a certain period of time and thereafter may be disposed of. Although conventional approaches are able to retain documents for a period of time and then dispose of them, these conventional approaches require that the retention duration be known and specified. With file security systems that oversee the creation and securing of electronic documents, often the electronic documents have retention periods that depend on future events that are unscheduled. Unfortunately, however, conventional approaches are unable to adequately handle document retention when unscheduled future events are involved.

Therefore, there is a need to provide more effective ways to impose document retention restrictions on electronic resources even when unscheduled future events are involved.

SUMMARY OF THE INVENTION

The invention relates to techniques for utilizing security criteria to implement document retention for electronic documents. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

In one embodiment, the security criteria can be managed by a document retention system. In another embodiment, the security criteria can be managed more generally by a file security system.

The invention can be implemented in numerous ways, including as a method, system, device, and computer readable medium. Several embodiments of the invention are discussed below.

As a method of providing automated document retention for electronic documents, one embodiment of the invention includes the acts of: obtaining an electronic document; assigning a document retention policy to the electronic document, the document retention policy being based on a future event that is unscheduled; and cryptographically imposing the document retention policy on the electronic document.

As a method for restricting access to an electronic document, one embodiment of the invention includes the acts of: identifying an electronic document to be secured, the electronic document having at least a data portion that contains data; obtaining a document key; encrypting the data portion of the electronic document using the document key to produce an encrypted data portion; obtaining a retention access key, the retention access key being used to enforce a document retention policy on the electronic document; encrypting the document key using the retention access key to produce an encrypted document key; forming a secured electronic document from at least the encrypted data portion and the encrypted document key; and storing the secured electronic document.

As a method for accessing a secured electronic document by a requester, the secured electronic document having at least a header portion and a data portion, one embodiment of the invention includes the acts of: obtaining a retention access key, the retention access key being used to enforce a document retention policy on the electronic document; obtaining an encrypted document key from the header portion of the secured electronic document; decrypting the encrypted document key using the retention access key to produce a document key; decrypting an encrypted data portion of the secured electronic document using the document key to produce a data portion; and supplying the data portion to the requestor.

As a method for distributing cryptographic keys used in a file security system, one embodiment of the invention includes the acts of: receiving a request for a document retention key that is necessary to gain access to a cryptographically secured electronic document; identifying a document retention period associated with the document retention key, the document retention period being dependent on a future event that was unscheduled when the document retention period was associated with the electronic document; determining whether the document retention period associated with the document retention key has been exceeded; and refusing to distribute the document retention key in response to the request when it is determined that the document retention period for the electronic document has been exceeded.

As a file security system for restricting access to electronic files, one embodiment of the invention includes at least a key store and an access manager operatively connected to the key store. The key store stores a plurality of cryptographic key pairs. Each of the cryptographic key pairs includes a public key and a private key, and at least one of the cryptographic key pairs pertains to a retention policy that is dependent on a future event. The access manager determines whether the private key of the at least one of the cryptographic key pairs pertaining to the retention policy is permitted to be provided to a requester based on whether the future event has occurred. The requester requires the private key of the at least one of the cryptographic key pairs pertaining to the retention policy to access a secured electronic file. The secured electronic file was previously secured using the public key of the at least one of the cryptographic key pairs pertaining to the retention policy, and the future event was unscheduled at the time the electronic file was so secured.

As a computer readable medium including at least computer program code for providing automated data retention for electronic data, one embodiment of the invention includes at least: computer program code for obtaining electronic data; computer program code for assigning a data retention policy to the electronic data, the data retention policy being based on a future event that is unscheduled; and computer program code for cryptographically imposing the data retention policy to the electronic data.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
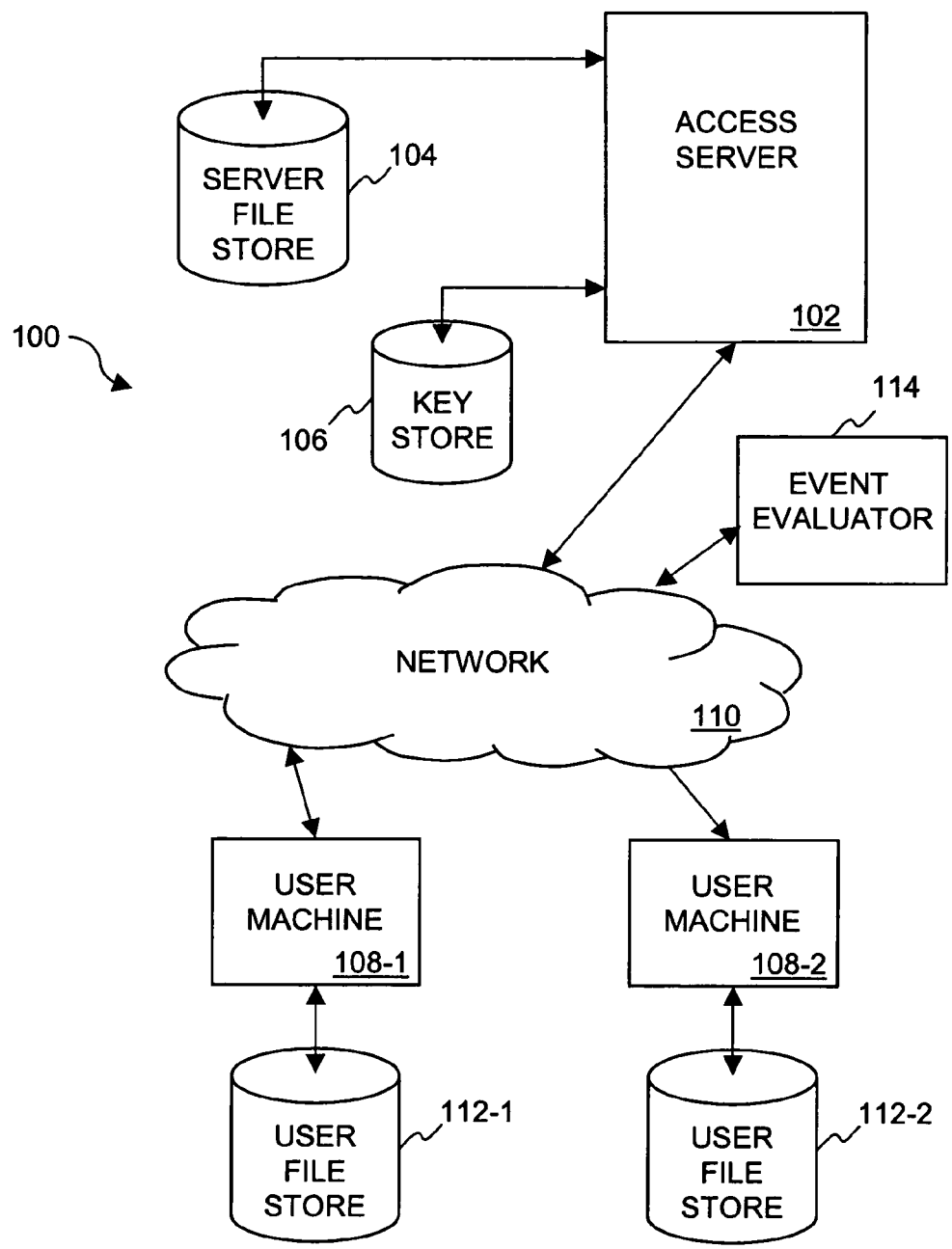
FIG. 1 is a block diagram of a file security system according to one embodiment of the invention.

The invention relates to techniques for utilizing security criteria to implement document retention for electronic documents. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

In one embodiment, the security criteria can be managed by a document retention system. In another embodiment, the security criteria can be managed more generally by a file security system.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains, or points to, security information. The security information is used to determine whether access to associated data portions of secured files is permitted.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being.

The invention is related to processes, systems, architectures and software products for providing automated retention of digital assets (e.g., electronic documents). The invention is particularly suitable in an enterprise environment. The invention can also be implemented by a security system that additionally secures digital assets (i.e., secured data) so that only authenticated users with appropriate access rights or privileges can gain access thereto. Digital assets may include, but not be limited to, various types of documents, multimedia files, data, executable code, images and text.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order, nor imply any limitations in the invention.

Embodiments of the invention are discussed herein with reference to FIGS. 1-11. However, those skilled in the art will readily appreciate that the detailed description given herein with respect to these figures is for explanatory purposes as the invention extends beyond these limited embodiments.

FIG. 1 is a block diagram of a file security system 100 according to one embodiment of the invention. The file security system 100 includes an access server 102 that provides central management for the file security system 100. The access server 102 can store or retrieve files from a server file store 104. The access server 102 can control the distribution of cryptographic keys from a key store 106. In addition, the access server 102 can generate cryptographic keys that are stored to the key store 106. Alternatively, the access server 102 can store cryptographic keys in the key store 106 that have been received by the access server 102.

The file security system 100 also includes user machines 108 and user file stores 112. The user machines 108 couple to the access server 102 via a network 110. The network 110 can be a private network or a public network. The user machine 108 also has a user file store 112 coupled thereto. The user file store 112 can store electronic files locally for the user of the corresponding user machine 108. On the other hand, the server file store 104 can provide centralized, remote storage of electronic files for any of the users of the user machines 108.

According to the invention, the file security system 100 enables a user at the user machine 108 to secure an electronic file (document) such that access to the secured electronic file is restricted. In one embodiment of the invention, the access restriction is or includes a document retention restriction. As an example, the document retention restriction could permit subsequent access to the secured electronic file only during the retention period. After the retention period, the secured electronic file would be unable to be unsecured and thus subsequent access would be cryptographically prevented. In one embodiment, the retention period is initially based on a future event that is unscheduled. Here, the file security system 100 can interact with an event evaluator 114 to determine (e.g., periodically) whether the future event has now been scheduled. Once the future event is scheduled, the retention period is determinable. The event evaluator 114 can be referred to as a remote resource that is used to evaluate future events. The event evaluator 114 can be a web server or a document management system (e.g., a contract management system).

Once an electronic file has been secured, a user at a user machine can attempt to access the secured electronic file. In doing so, the user machine for the user would need to access the access server 102 and retrieve the appropriate one or more cryptographic keys from the key store 106 that are needed to unsecure the secured electronic file. However, after expiration of the retention period for the secured electronic document, the access server 102 does not permit the delivery of at least certain cryptographic keys from the key store 106 (private keys) that are needed to unsecure secured electronic files. The access server 102 normally also requires the user to be authorized to access the electronic file prior to delivery of at least certain cryptographic keys from the key store 106. Typically, the cryptographic keys needed to unsecure a secured electronic file are private keys.

Nevertheless, once the restrictions and/or authorizations have been satisfied and the private keys have been supplied, the private keys are usable to unsecure the secured electronic files. Typically, the private keys will expire after a relatively short period of time (e.g., 1-30 days) so that users are forced to again retrieve the necessary cryptographic keys.

Figure 2:
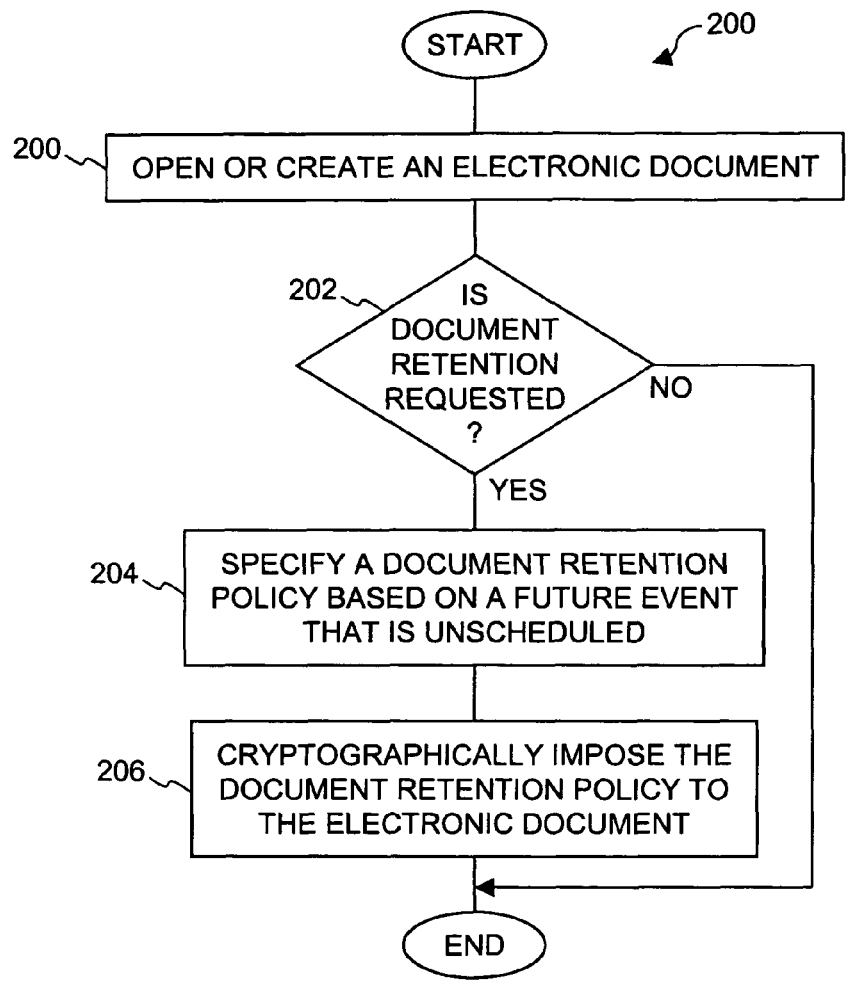
FIG. 2 is a flow diagram of a retention policy assignment process according to one embodiment of the invention.

FIG. 2 is a flow diagram of a retention policy assignment process 200 according to one embodiment of the invention. The retention policy assignment process 200 operates to cryptographically secure an electronic document to implement document retention. The retention policy assignment process 200 is, for example, performed by a computing device, such as the access server 102 or the user machines 108 illustrated in FIG. 1.

The retention policy assignment process 200 initially opens or creates 200 an electronic document. A user of a computing device may assist with the opening or creation of the electronic document. Next, a decision 202 determines whether document retention is requested. Here, according to the invention, document retention policies can be imposed on the electronic document. Hence, the decision 202 determines whether document retention is to be imposed on the electronic document. When the decision 202 determines that document retention is not to be imposed, then the retention policy assignment process 200 is complete and ends with no document retention policy being imposed.

On the other hand, when the decision 202 determines that document retention is requested, then a document retention policy is specified 204 based on a future event that is presently unscheduled. Typically, the document retention policy specifies that the electronic document is to be maintained until some future point in time. However, when the document retention policy is based on a future event which is presently unscheduled, the future point in time is not known and cannot be determined. Once the future event becomes scheduled, then the period of time for document retention can be determined. In other words, the document retention policy becomes determinable because the future event is no longer unscheduled. Next, the document retention policy is cryptographically imposed 206 on the electronic document. Recall, however, that the document retention policy at this point is based on a future event which is presently unscheduled. In one implementation, a cryptographic key is utilized to encrypt the electronic document so that access to the electronic document can be restricted after the document retention policy has been exceeded. In other words, after the period of time for document retention specified by the document retention policy has been exceeded, the cryptographic key that is needed to gain access to the electronic document is no longer made available to users. As a result, because the electronic document was previously cryptographically secured using a cryptographic key, if the corresponding or counterpart cryptographic key is no longer available, then the electronic document remains encrypted and thus unusable. In any case, following the operation 206, the retention policy assignment process 200 is complete and ends.

Once a document retention policy has been assigned to an electronic document, the document retention system or file security system 100 as shown in FIG. 1 needs to periodically evaluate whether future events associated with the document retention policies are now scheduled. In one embodiment, the access server 102 shown in FIG. 1 can be utilized to periodically evaluate whether future events have become scheduled.

Figure 3:
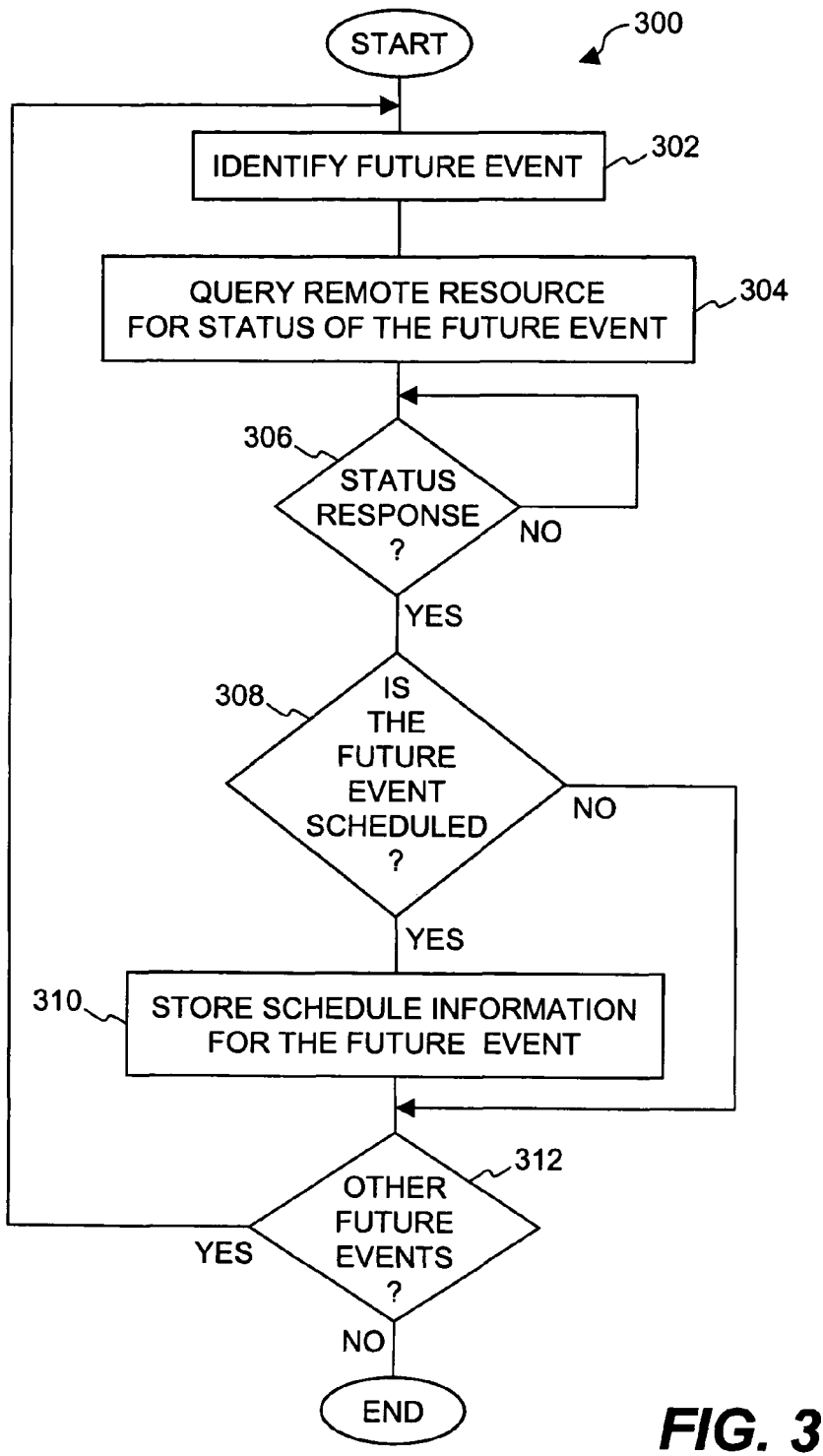
FIG. 3 is a flow diagram of a future event evaluation process according to one embodiment of the invention.

FIG. 3 is a flow diagram of a future event evaluation process 300 according to one embodiment of the invention. The future event evaluation process 300 can, for example, be performed by the access server 102 illustrated in FIG. 1.

The future event evaluation process 300 initially identifies 302 a future event. Here, the future event is a future event that is being monitored by a document retention system (or file security system) because it is utilized by one or more document retention policies assigned to one or more electronic documents managed by the system. After the future event has been identified 302, a remote resource can be queried 304 for status of the future event. The remote resource can, for example, be a file, a web server or an external system. An example of an external system would be a document management system or a contract management system. In any case, the event evaluator 114 shown in FIG. 1 can represent the remote resource that is being queried 304.

Next, a decision 306 determines whether a status response has been received from the remote resource. When the decision 306 determines that a status response has not been received, then the future event evaluation process 300 awaits a status response. However, after a period of time in which no response is received, the status response can be deemed or default to indicate that the future event remains unscheduled. On the other hand, when the decision 306 determines that the status response has been received, a decision 308 determines whether the future event is now scheduled by examination of the status response. When the decision 308 determines that the future event is now scheduled, then schedule information pertaining to the future event can be stored 310. For example, the access server 102 shown in FIG. 1 can store schedule information for the future event. At a minimum, the schedule information can contain an indication that the future event is now scheduled. Typically, the schedule information would specify a date representing the occurrence (past or future) of the future event. Alternatively, when the decision 308 determines that the future event still remains unscheduled, then the operation 310 is bypassed.

Following the operation 310 or its being bypassed, a decision 312 determines whether there are other future events to be evaluated. When the decision 312 determines that there are other future events to be evaluated, the future event evaluation process 300 returns to repeat the operation 302 and subsequent operations, thereby allowing other future events to be similarly evaluated. On the other hand, when the decision 312 determines that there are no other future events to be evaluated, then the future event evaluation process 300 is complete and ends. Typically, the future event evaluation process 300 would be periodically invoked to evaluate whether any future events have become scheduled.

In one embodiment, when the remote resource can be addressed for requests (queries) by a Universal Resource Locator (URL). The URL could point to a file, a web-server or some other web-based application. In case where the URL points to a file, the file stores and can provide the status response as to whether the associated future event is unscheduled or not. The URL specifies the correct file and can do so by identifying the descriptions of future events, an event type and an event identifier.

In another embodiment, when the remote resource is a web server or an external system, the request (query) to the web server or external system can use a URL to access the web server. The URL can specify the web server or external system and describe the future event of interest. Alternatively, the query or request to the web server or external system can be a markup language (e.g., XML) document. Such a status request would also at least describe the future event of interest. The status response from the web server or external system can return an indication as to whether the associated future event is unscheduled or not. As an example, the status response can be a markup language (e.g., XML) document. It should be noted that the status response can also be signed with an electronic signature that can be used to authenticate its origin.

In still another embodiment, the remote resource is network accessible (e.g., web server or external system). Here, the remote resource can be accessed using networking techniques, such as TCP/IP networks, to get future event information from the remote resource.

Figure 4:
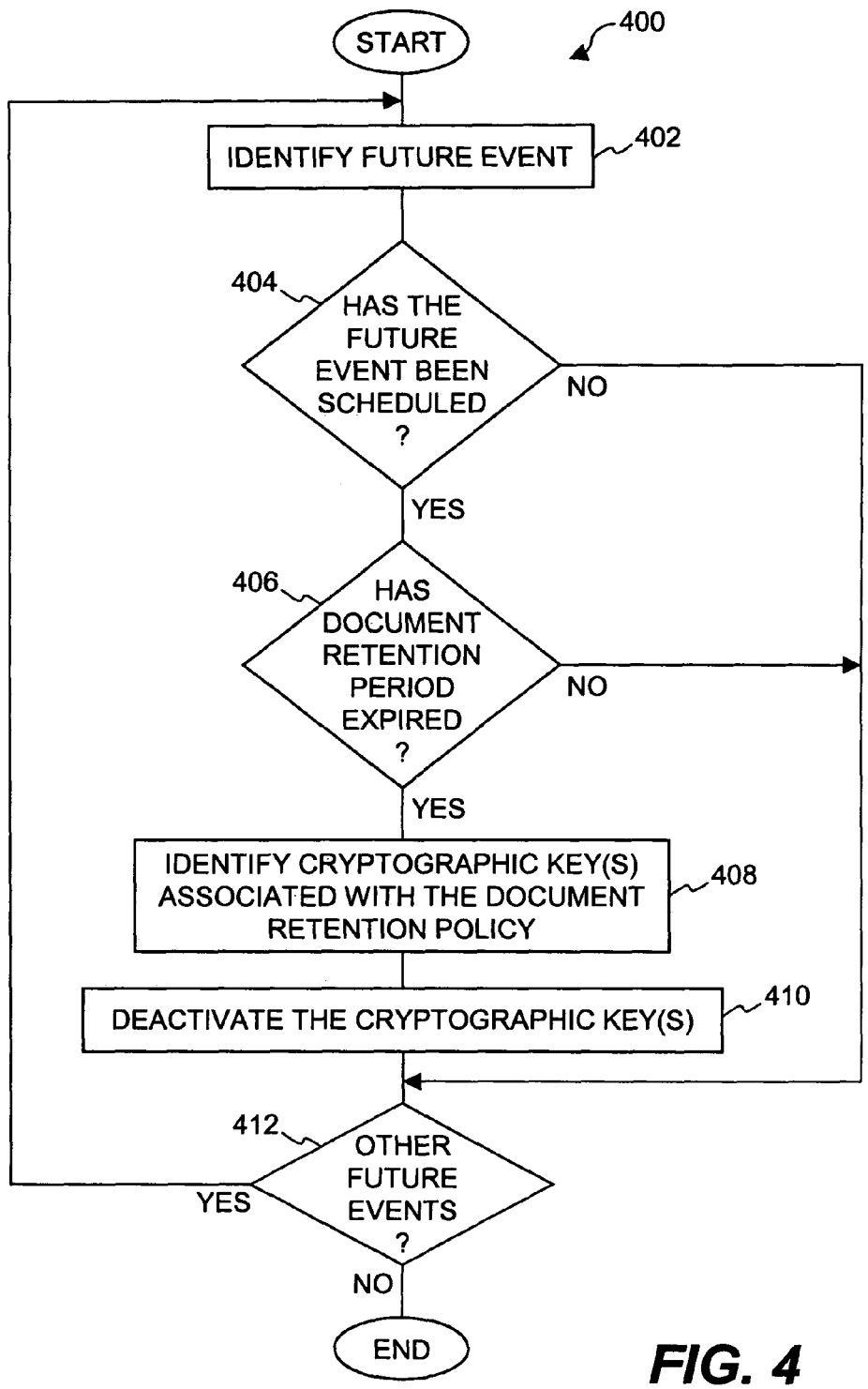
FIG. 4 is a flow diagram of an expiration process according to one embodiment of the invention.

FIG. 4 is a flow diagram of an expiration process 400 according to one embodiment of the invention. The expiration process 400 represents other processing that determines whether document retention periods associated with electronic documents have been exceeded, and if so, renders the associated electronic documents inaccessible. The expiration process 400 would typically be periodically invoked. The expiration process 400 can, for example, be performed by the access server 102 illustrated in FIG. 1.

The expiration process 400 initially identifies 402 a future event. Here, the future event is a future event associated with a document retention policy that is being utilized to retain one or more electronic documents by a document retention system (or file security system).

Next, a decision 404 determines whether the future event has been scheduled. As an example, the decision 404 can examine schedule information that is stored by the future event evaluation process 300 illustrated in FIG. 3. In any case, the decision 404 determines whether the future event has now been scheduled. When the decision 404 determines that the future event has been scheduled, then a decision 406 determines whether a document retention period associated with the now scheduled future event has expired. For example, a document retention period might typically be represented as a predetermined period of time following a future event. Hence, once the future event is scheduled and thus has a date certain, the document retention period is determinable.

When the decision 406 determines that the document retention period has expired, then the cryptographic key associated with the document retention policy is identified 408. The document retention policy may be associated with one or a plurality of cryptographic keys that are utilized to secure one or a plurality of different electronic documents. In any event, once the cryptographic key is identified 408, the cryptographic key is deactivated 410. In other words, the cryptographic key utilized to implement the document retention policy for the electronic document is destroyed, deleted or disabled. Consequently, the cryptographic key is no longer useable to gain access to the electronic document that has been encrypted therewith, thereby implementing the document retention policy. In other words, the associated electronic document is thereafter inaccessible by those persons or machines that were previously able to access the electronic document. In effect, the electronic document has been effectively destroyed. The operations 408 and 410 are bypassed when the decision 404 determines that the future event has not yet been scheduled or when the decision 406 determines that the document retention period has not yet expired.

In any case, following the operation 410 or its being bypassed, a decision 412 determines whether there are other future events to be similarly processed so as to determine whether the associated document retention period or periods have expired. Hence, when the decision 412 determines that other future events are to be processed, the expiration process 400 returns to repeat the operation 402 and subsequent operations to process another future event.

Figure 5:
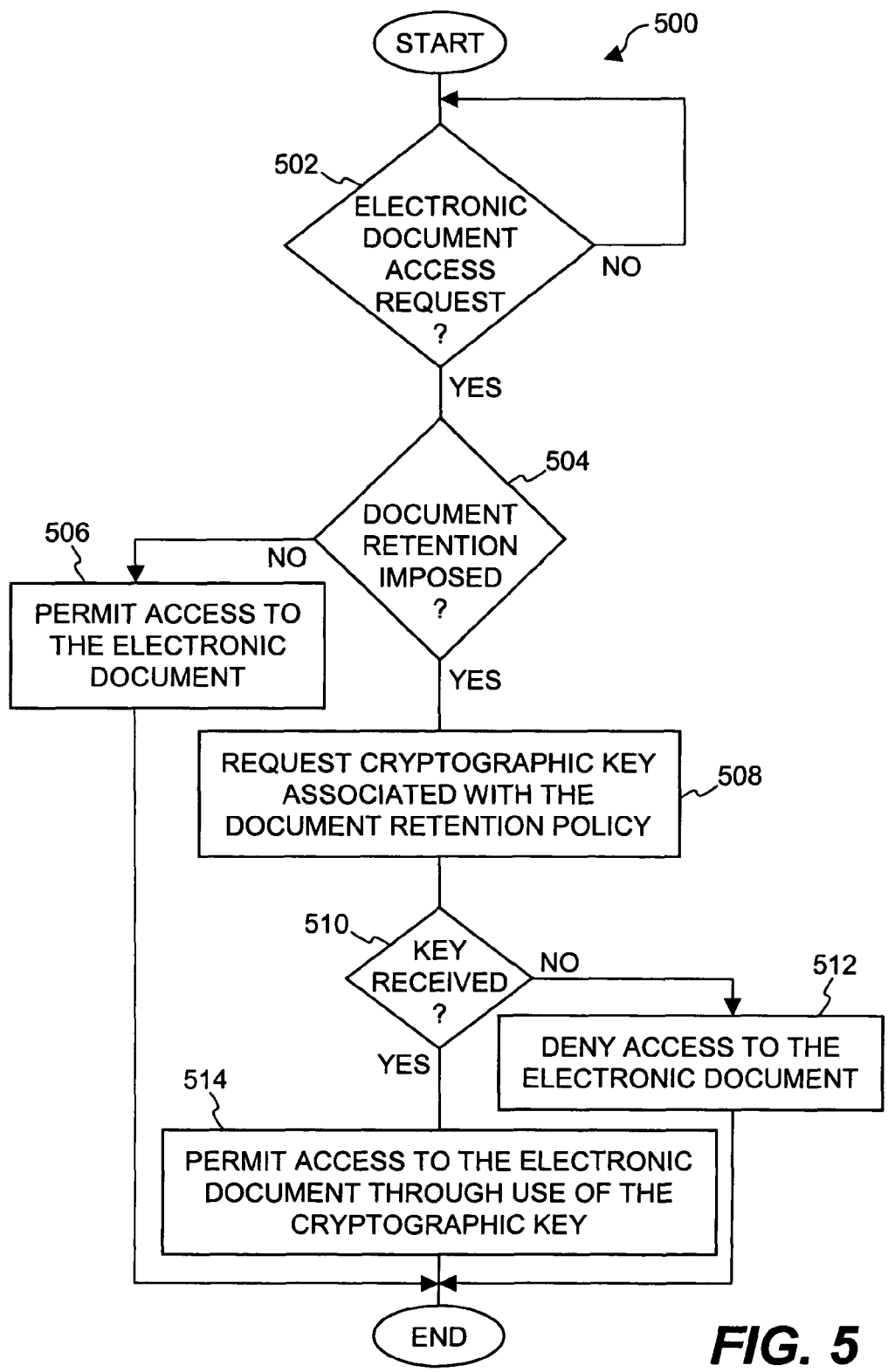
FIG. 5 is a flow diagram of an access request process according to one embodiment of the invention.

FIG. 5 is a flow diagram of an access request process 500 according to one embodiment of the invention. The access request process 500 is, for example, performed by a computing device, such as the user machines 108 illustrated in FIG. 1.

The access request process 500 begins with a decision 502 that determines whether an electronic document access request has been received. A user of a computing device can initiate an electronic document access request. When the decision 502 determines that an electronic document access request has not been received, then the access request process 500 awaits such as request. Once the decision 502 determines that a document access request has been received, then a decision 504 can determine whether document retention is imposed on the electronic document that is to be accessed. When the decision 504 determines that document retention is not imposed on the electronic document to be accessed, access to the electronic document is permitted 506.

On the other hand, when the decision 504 determines that document retention is imposed on the electronic document to be accessed, a cryptographic key associated with the document retention policy that is imposed on the electronic document is requested 508. A decision 510 then determines whether the requested key has been received. Here, the requested key is the cryptographic key that has been requested 508. In one implementation, such as shown in FIG. 1, the user machine 108 requests the key from the access server 102, and the key is provided (if at all) to the user machine 108 via the network 110.

When the decision 510 determines that the requested key has not been received, then access to the electronic document is denied 512. In this case, the document retention policy causes the cryptographic key to be no longer available to the requestor. In such case, although the requestor may have access to the electronic document, since the cryptographic key is not available, the requestor is not able to gain access to the electronic document. In other words, the electronic document remains in its encrypted format and thus unusable by the requestor. In such case, the document retention policy imposed on the electronic document caused the electronic document to expire.

On the other hand, when the decision 510 determines that the requested key has been received, then access to the electronic document is permitted 514 through use of the cryptographic key. In other words, the cryptographic key can be used to decrypt the encrypted electronic document, thereby allowing the requestor to gain access to the electronic document.

Following the operations 506, 512 and 514, the access request process 500 is complete and ends. However, it should be noted that additional layers of encryption could be imposed on the electronic document besides the level of encryption utilized to implement a document retention policy. Hence, other keys or requirements can be imposed by a file security system in order to further restrict access to the electronic documents. For example, co-pending U.S. patent application Ser. No. 10/405,587, filed Apr. 1, 2003 and entitled "METHOD AND SYSTEM FOR SECURING DIGITAL ASSETS USING CONTENT TYPE DESIGNATIONS," describes representative other document security measures and is hereby incorporated herein by reference.

As previously noted, document retention can be provided by a file security system. In which case, an electronic file can be cryptographically secured using a key that is associated with file retention. The key can then automatically be made unavailable after the retention period for the electronic document has been exceeded. Accordingly, the electronic file is no longer accessible after the retention period is exceeded. Typically, such inaccessibility is permanent and irreversible. However, in special situations, the automatic nature of the non-retention can be suspended so as to permit extended access. For example, a system administrator can cause the retention period to be extended so that the electronic file remains accessible even after the original extension period has been scheduled. This override capability can be important when, for example, legal issues arise concerning the electronic file. In such cases, the electronic file should be retained and not automatically expired. In one embodiment, the system administrator can either override an assigned retention period or set a new retention period (which may also be based on a future event).

Figure 6:
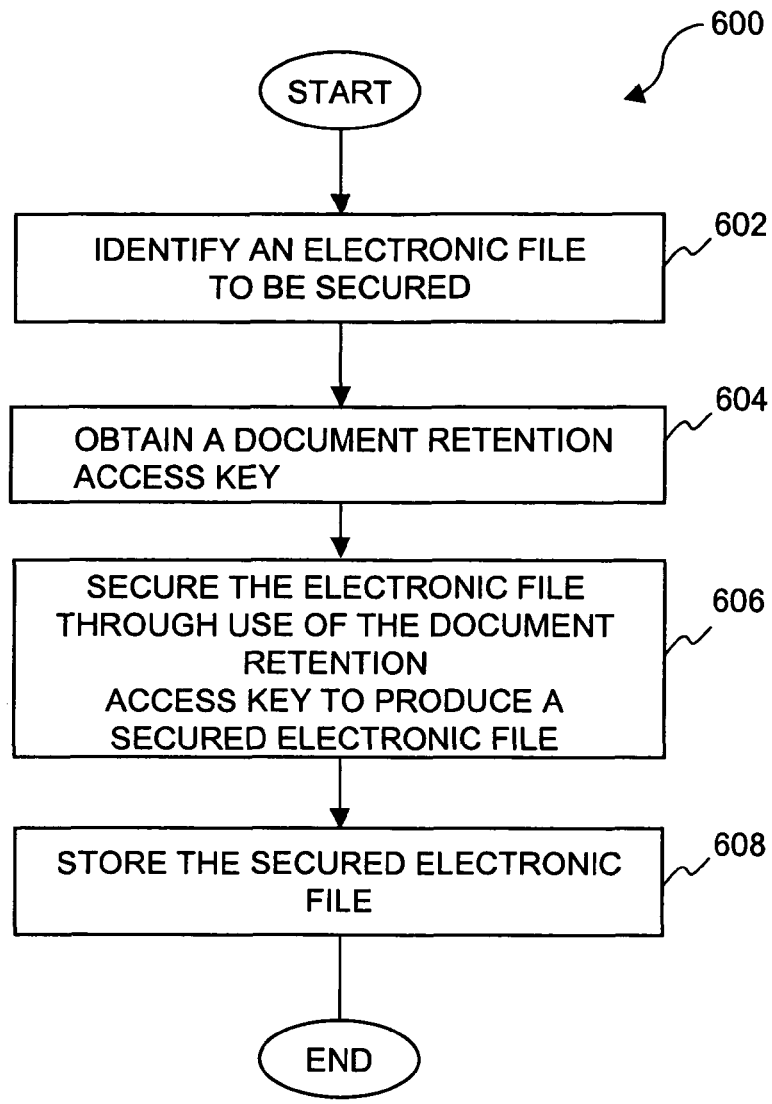
FIG. 6 is a flow diagram of a file securing process according to one embodiment of the invention.

FIG. 6 is a flow diagram of a file securing process 600 according to one embodiment of the invention. The file securing process 600 is, for example, performed by a computing device, such as the access server 102 or the user machines 108 illustrated in FIG. 1.

The file securing process 600 initially identifies 602 an electronic file to be secured. Here, the electronic file is identified to the computing device carrying out the file securing process 600. A user of the computing device may assist in the identification of the electronic file. After the electronic file to be secured has been identified 602, a document retention access key is obtained 604. Typically, the document retention access key is obtained 604 from an access server. For example, if the file securing process 600 is performed by the user machine 108, the document retention access key can be retrieved remotely from the access server 102, which can retrieve the document retention access key from the key store 106. Here, the document retention access key is a public key and is normally readily available.

Next, after the time-based access key has been obtained 604, the electronic file is secured 606 through use of the document retention access key. The result of the securing of the electronic file is to produce a secured electronic file. Typically, the electronic file is cryptographically secured through encryption (directly or indirectly) using the document retention access key. In one embodiment, one or more other keys are used to further control access to the electronic file. Thereafter, the secured electronic file is stored 608. After the secured electronic file is stored 608, the file securing process 600 ends. Following the securing process 600, the secured electronic file can be distributed to one or more user machines 108 having interested users.

Figure 7A:
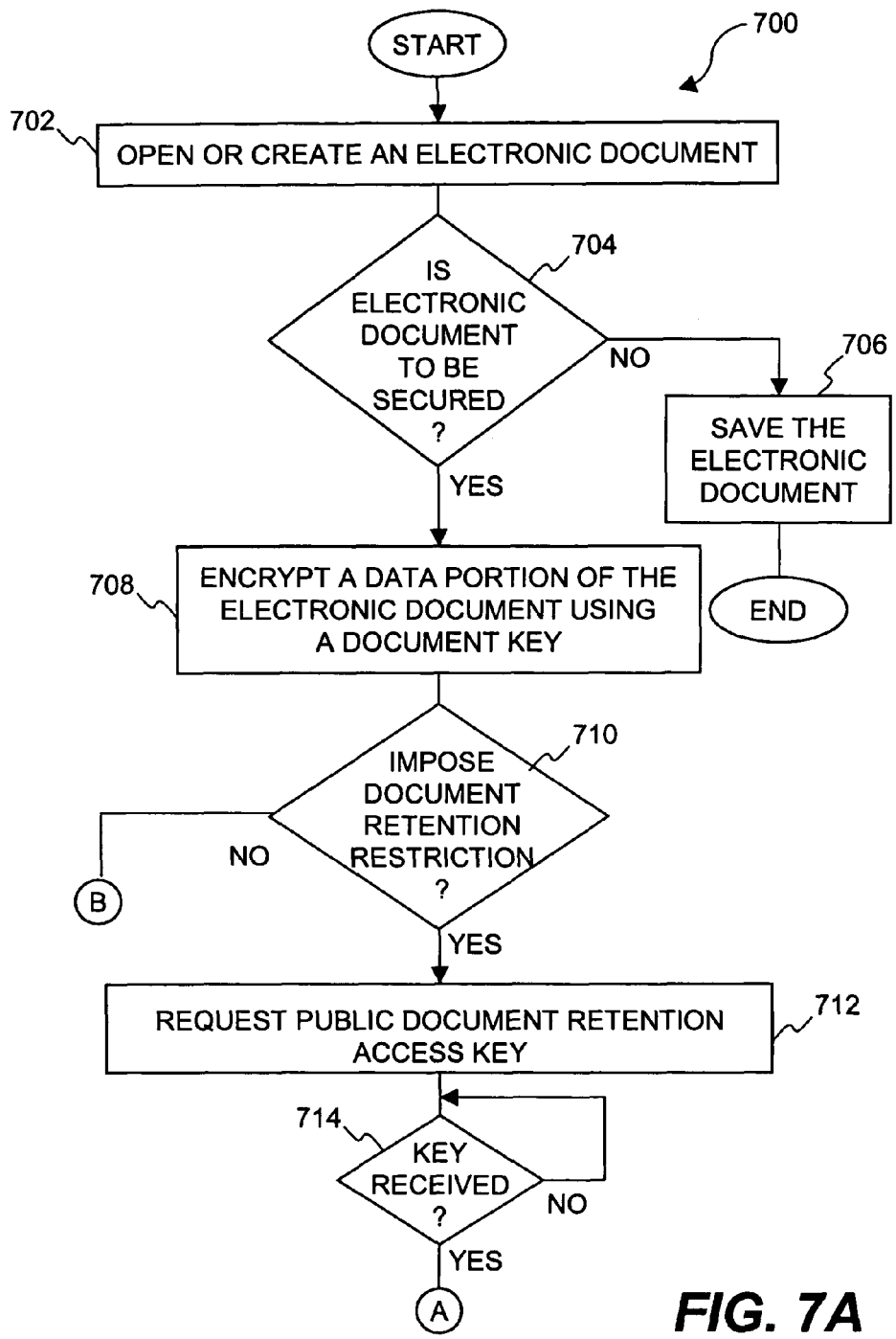
FIGS. 7A and 7B are flow diagrams of a document securing process according to one embodiment of the invention.
Figure 7B:
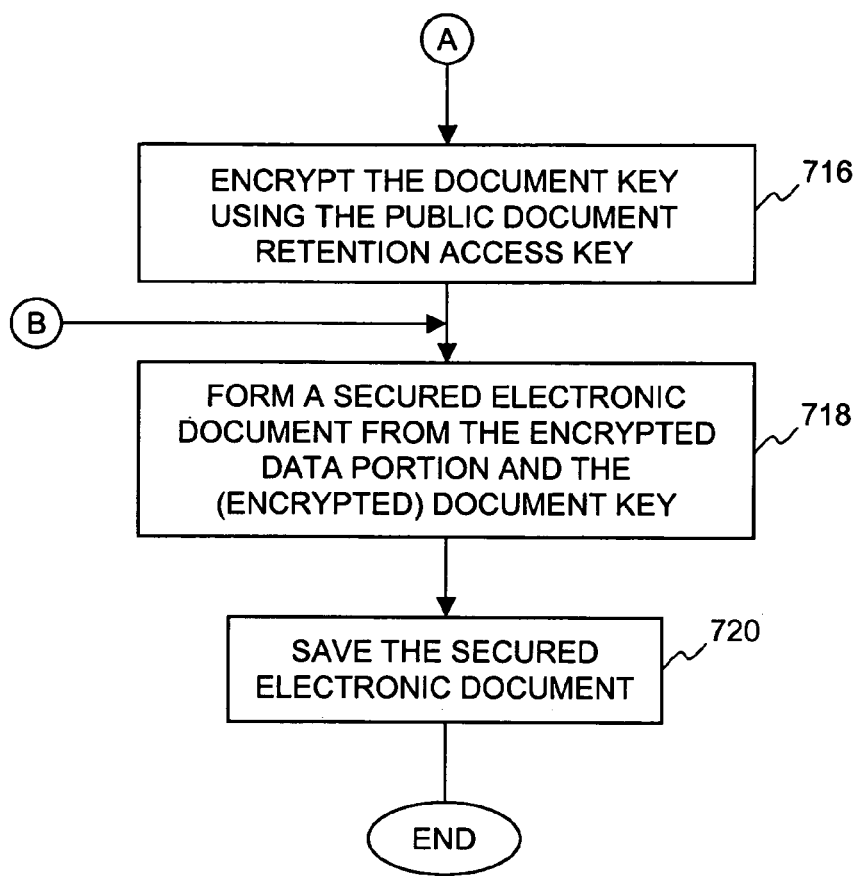

FIGS. 7A and 7B are flow diagrams of a document securing process 700 according to one embodiment of the invention. The document securing process 700 is, for example, performed by a computing device, such as the access server 102 or the user machines 108 illustrated in FIG. 1.

The document securing process 700 opens or creates 702 an electronic document. At this point, the electronic document is unsecure, which is often referred to as being in the "clear." Next, a decision 704 determines whether the electronic document is to be secured. Here, the user or creator of the electronic document has the option of securing the document, if so desired. When the decision 704 determines that the electronic document is not to be secured, then the electronic document is saved 706. Here, the electronic document being saved is not secured. Following the block 706, the document securing process 700 ends with the electronic document being saved in an unsecured fashion.

On the other hand, when the decision 704 determines that the electronic document is to be secured, then a data portion of the electronic document is encrypted 708 using a document key. The document key can be a cryptographic key that is generated or obtained. Typically, each document managed and secured by the file (document) security system would be encrypted 708 using a different document key. After the data portion of the electronic document has been encrypted 708, a decision 710 determines whether a document retention restriction should be imposed on the electronic document. The user or creator of the electronic document can have the option of securing the document with a document retention access restriction, if so desired.

When the decision 710 determines that a document retention restriction should be imposed on the electronic document, a public document retention access key is requested 712. In one embodiment, the public document retention access key can be requested from the access server 102 by the user machine 108. The access server 102 can then retrieve or generate the public document retention access key and supply it to the user machine 108. In an alternative implementation, the user machine may have already received the public document retention access key (e.g., such as in a key cache) and thus would not need to request such.

Next, a decision 714 determines whether the public document retention access key has been received. Once the decision 714 determines that the public document retention access key has been received (or already available), the document key is encrypted 716 using the public document retention access key. Here, the document key is being encrypted using the public document retention access key. In other words, the public document retention access key is indirectly used to encrypt the electronic document by encryption of the document key. Next, a secured electronic document is formed 718 from the encrypted data portion and the encrypted document key. Thereafter, the secured electronic document is saved 720. In this case, following the block 720, the document securing process 700 ends with the electronic document being saved in a secured fashion with at least a document retention access restriction.

Alternatively, when the decision 710 determines that a document retention access restriction is not to be imposed on the electronic document, then the blocks 712-716 are bypassed. In such case, the secured electronic document is formed 718 from the encrypted data portion and the document key. Here, the document key is not encrypted using a public document retention access key. The resulting secured electronic document is then saved 720. In this case, following the block 720, the document securing process 700 ends with the electronic document being saved in a secured fashion without any time-based access restrictions.

Figure 8:
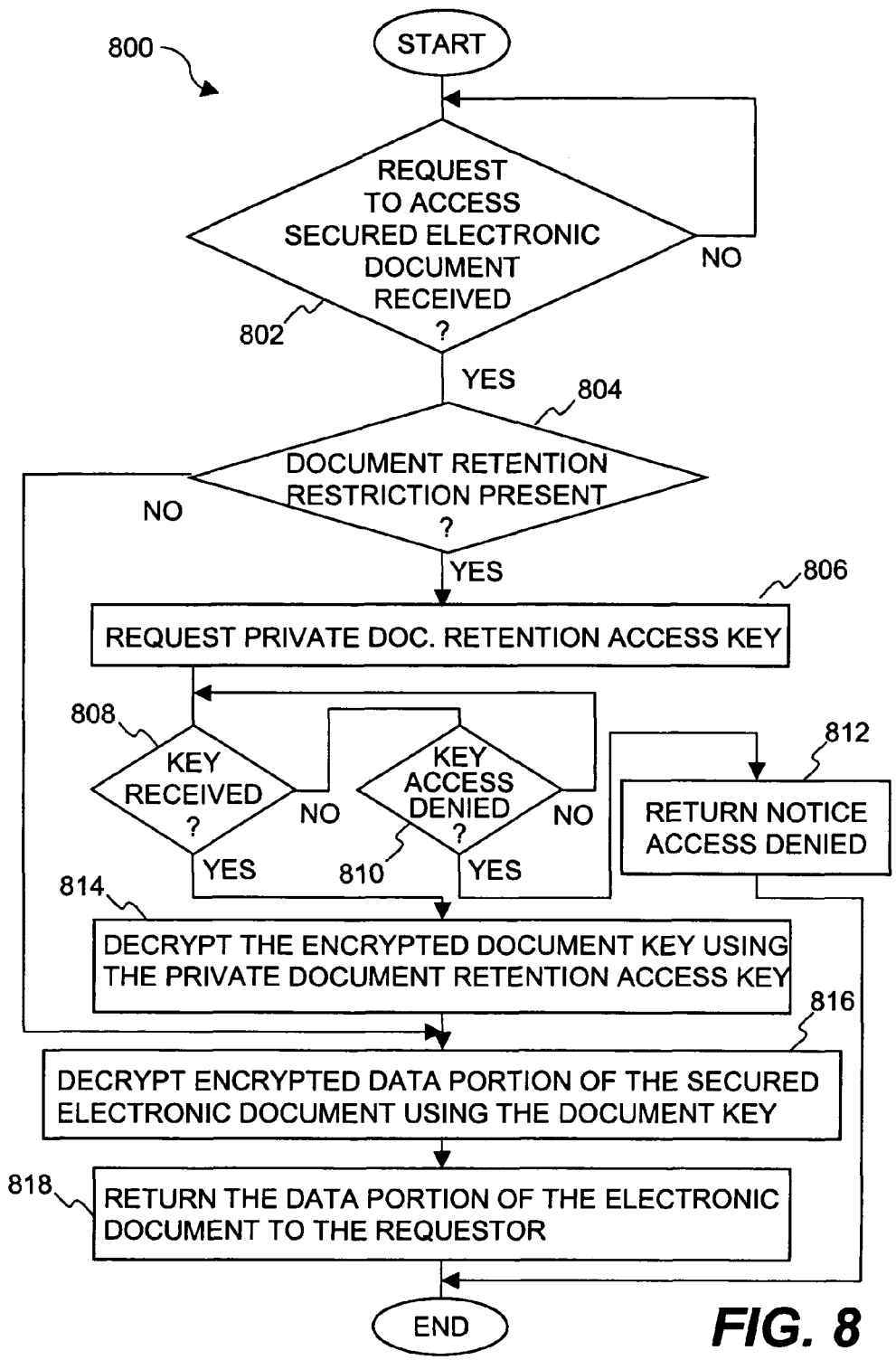
FIG. 8 is a flow diagram of a document unsecuring process according to one embodiment of the invention.

FIG. 8 is a flow diagram of a document unsecuring process 800 according to one embodiment of the invention. The document unsecuring process 800 can be performed at a client machine or a server machine, such as the user machine 108 or the access server 102 illustrated in FIG. 1.

The document unsecuring process 800 begins with a decision 802 that determines whether a request to access a secured electronic document has been received. When the decision 802 determines that a request to access a secured electronic document has not yet been received, the document unsecuring process 800 awaits such a request. In other words, the document unsecuring process 800 can be considered to be invoked once access to a secured electronic document is requested.

Once the decision 802 determines that a request to access a secured electronic document has been received, a decision 804 determines whether a document retention restriction is present. In one implementation, the decision 804 can evaluate a header portion of the secured electronic document to determine whether a document retention restriction is present. In another implementation, the decision 804 can evaluate a system policy to determine whether a document retention restriction is present. As an example, the header can include an indicator of a document retention restriction.

When the decision 804 determines that a document retention restriction is present, then a private document retention access key is requested 806. In one embodiment, the private document retention access key is requested 806 from a file security system, such as a server machine thereof (e.g., access server 102). Then, a decision 808 determines whether the requested key has been received. When the decision 808 determines that the requested key has not yet been received, a decision 810 determines whether access to the requested key has been denied. Typically, the private document retention access key is only available so long as a retention period for the secured electronic document has not been exceeded. In one embodiment, the access server 102 controls access to the private document retention access key which is stored in the key store 106. Hence, in such an embodiment, the access server 102 would deny any request for the document retention access key after the retention period has been exceeded. In any case, when the decision 810 determines that access to the requested key has been denied, then access to the secured electronic document is denied and notice that access has been denied is returned 812. In one embodiment, the notice can more specifically indicate that access is denied because the document has expired. Following the block 812, the document unsecuring process 800 ends with access to the secured electronic document being denied.

On the other hand, when the decision 810 determines that access to the requested key has not been denied, then the document unsecuring process 800 returns to repeat the decision 808 so as to wait for the requested key to be received. Once the decision 808 determines that the requested key (the private document retention access key) has been received, the encrypted document key from the secured electronic document is decrypted 814 using the private document retention access key to yield the document key (unencrypted). Here, in one embodiment, a header portion of the secured electronic document includes at least the encrypted document key (as well as the indicator for the private document retention access key). Next, an encrypted data portion of the secured electronic document is decrypted 816 using the document key. Finally, the data portion of the electronic document is then returned 818 to the requester. Additionally, it should be noted that when the decision 804 determines that a document retention access restriction is not present, then the document unsecuring process 800 skips blocks 806-814 and proceeds to block 816. Following block 818, the document unsecuring process 800 ends with access to the secured electronic document being successful.

In one embodiment, the document retention access keys (e.g., the public and private key pair) can be unique (i.e., different) for each electronic document. Alternatively, to manage the number of key pairs, the document retention access keys can be shared by electronic documents being retained for a like duration.

Figure 9:
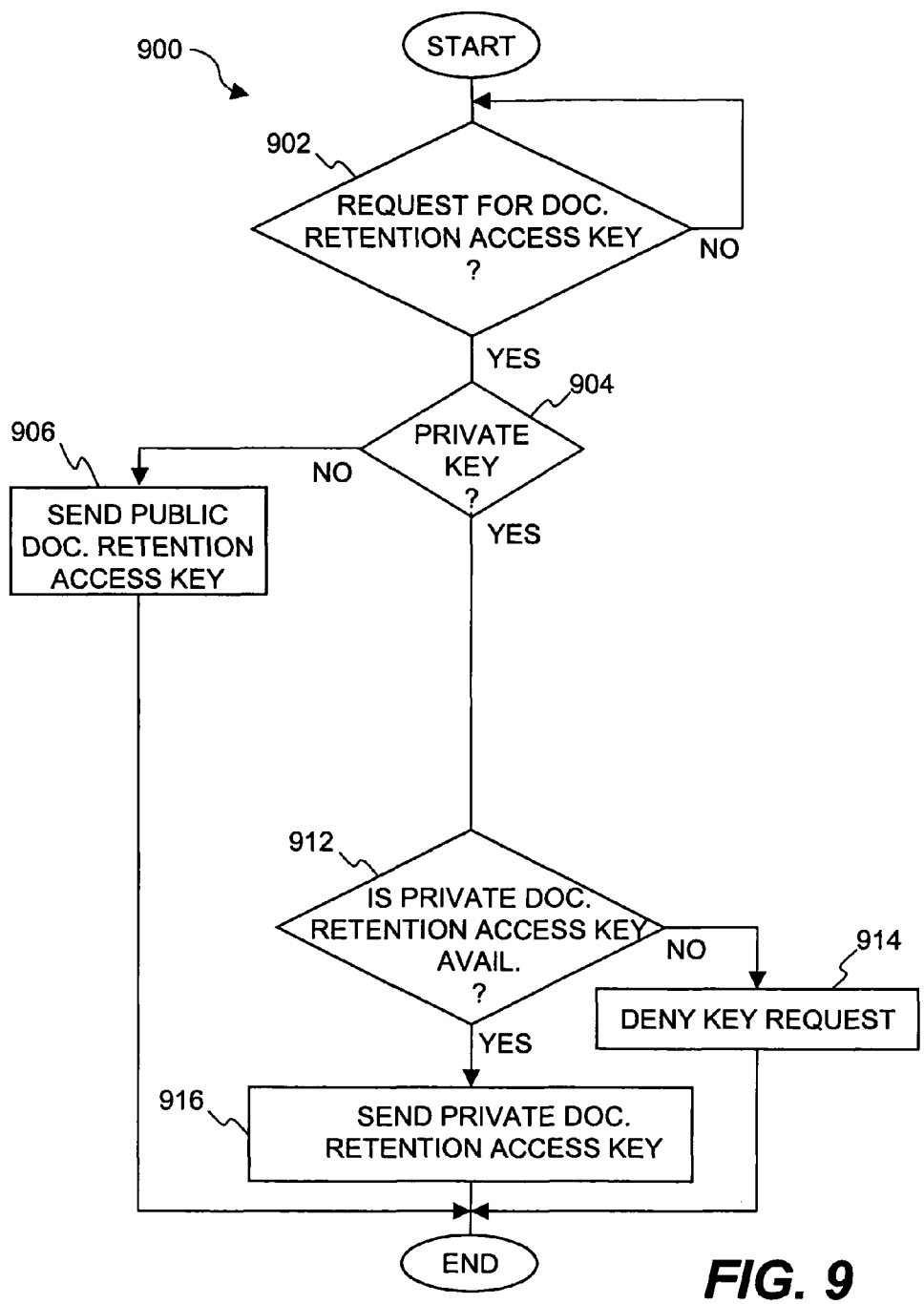
FIG. 9 is a flow diagram of an access key retrieval process according to one embodiment of the invention.

FIG. 9 is a flow diagram of an access key retrieval process 900 according to one embodiment of the invention. The access key retrieval process 900 is, for example, performed by a server machine, such as the access server 102 illustrated in FIG. 1.

The access key retrieval process 900 begins with a decision 902 that determines whether a request for a document retention access key has been received. When the decision 902 determines that a request for a document retention access key has not yet been received, the access key retrieval process 900 awaits such a request. Once the decision 902 determines that a document retention access key has been received, the access key retrieval process 900 continues. In other words, the access key retrieval process 900 can be deemed invoked when a request for a document retention access key is received.

In any case, once the access key retrieval process 900 continues, a decision 904 determines whether the requested access key is a private key. When the decision 904 determines that the requested key is not a private key (i.e., is a public key), then a public document retention access key (which was requested) is sent 906. Typically, the public document retention access key would be sent to a requestor (such as a user machine). In one embodiment, the public document retention access key is retrieved from a remote key store by a server and sent by the server to the requestor.

On the other hand, when the decision 904 determines that the requested key is a private key (i.e., a private document retention access key), a decision 912 determines whether the private document retention access key is available. When the decision 912 determines that the private document retention access key is not available, then the key request is denied 914. In such case, the requestor would not be able to utilize the electronic documents that have been secured with the associated document retention policy. In effect, the electronic documents would be deemed expired (i.e., no longer retained).

Alternatively, when the decision 912 determines that the private document retention access key is available, then the private document retention access key is sent 916 to the requester. In this case, the requestor is able to use the requested key to gain access to the electronic documents. Following the blocks 906, 914 and 916, the access key retrieval process 900 ends.

Figure 10:
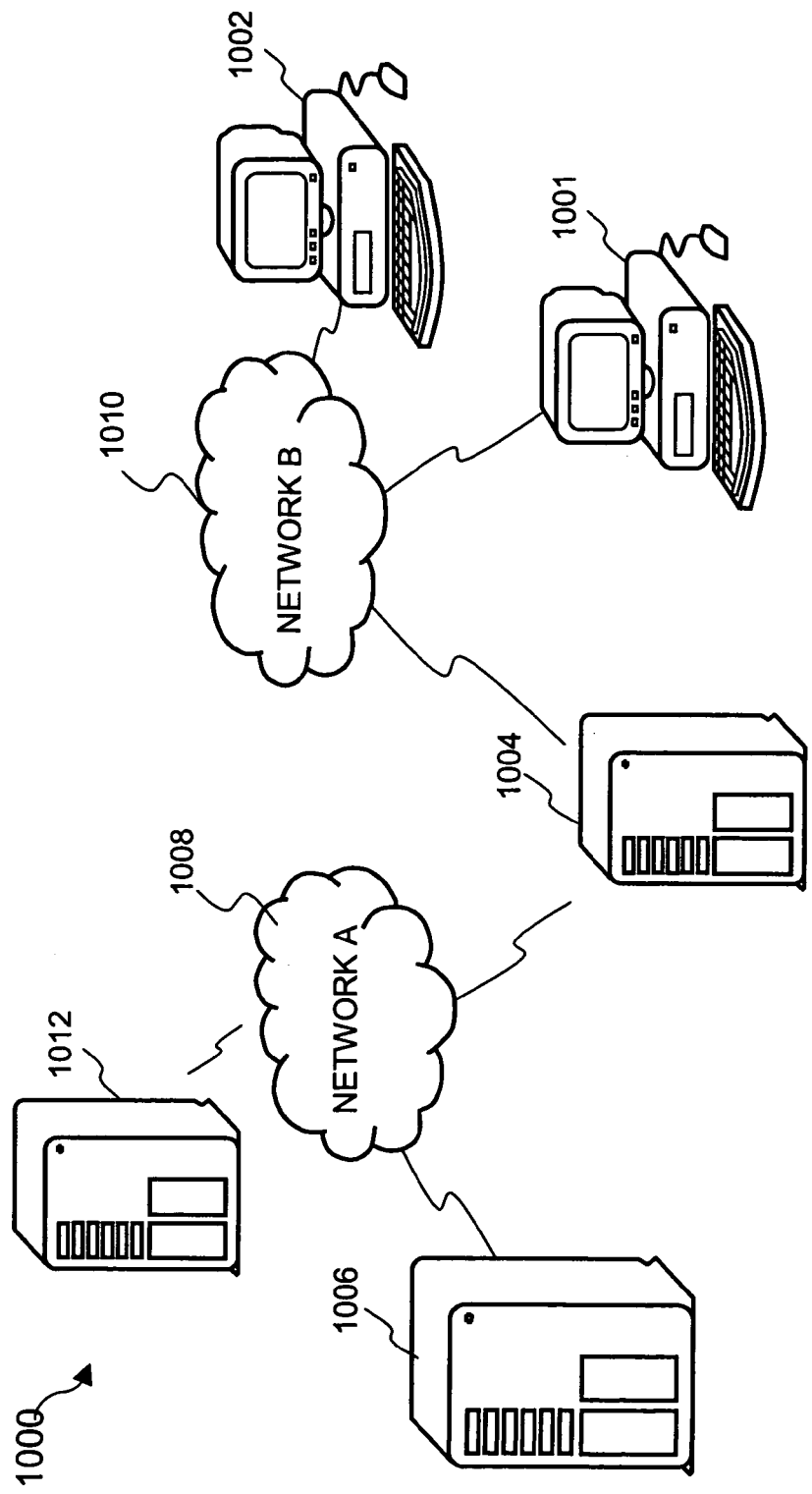
FIG. 10 shows a basic security system in which the invention may be practiced in accordance with one embodiment thereof.

FIG. 10 shows a basic security system 1000 in which the invention may be practiced in accordance with one embodiment thereof. The security system 1000 may be employed in an enterprise or inter-enterprise environment. It includes a first server 1006 (also referred to as a central server) providing centralized access management for the enterprise. The first server 1006 can control restrictive access to files secured by the security system 1000 as well as file (e.g., document) retention. To provide dependability, reliability and scalability of the system, one or more second servers 1004 (also referred to as local servers, of which one is shown) may be employed to provide backup or distributed access management for users or client machines serviced locally. The server 1004 is coupled to a network 1008 and a network 1010. For illustration purposes, there are two client machines 1001 and 1002 being serviced by the local server 1004. Alternatively, one of the client machines 1001 and 1002 may be considered as a networked storage device.

Secured files may be stored in any one of the devices 1001, 1002, 1004 and 1006. When a user of the client machine 1001 attempts to exchange a secured file with a remote destination 1012 being used by an external user, the processes discussed above can be utilized to ensure that the requested secure file is delivered without compromising the security imposed on the secured file.

According to one embodiment, a created document is caused to go through an encryption process that is preferably transparent to a user. In other words, the created document is encrypted or decrypted under the authoring application so that the user is not aware of the process. One or more keys, such as a user key and a document retention access key, can be used to retrieve a file key to decrypt an encrypted document. Typically, the user key is associated with an access privilege for the user or a group of users, and the document retention access key is associated with a retention period imposed on the created document. For a given secured document, only a user with proper access privileges can access the secured document and then only after a time restriction, if present, is satisfied.

In one setting, a secured document may be uploaded via the network 1010 from the client computer 1001 to a computing or storage device 1002 that may serve as a central repository. Although not necessary, the network 1010 can provide a private link between the computer 1001 and the computing or storage device 1002. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computing or storage device 1002 may be remotely accessed.

In another setting, the computer 1001 and the computing or storage device 1002 are inseparable, in which case the computing or storage device 1002 may be a local store to retain secured documents or receive secured network resources (e.g., dynamic Web contents, results of a database query, or a live multimedia feed). Regardless of where the secured documents or secured resources are actually located, a user, with proper access privileges and within retention periods, can access the secured documents or resources from the client computer 1001 or the computing or storage device 1002 using an application (e.g., Microsoft Internet Explorer, Microsoft Word or Adobe Acrobat Reader).

Accordingly, respective local modules in local servers, in coordination with the central server, form a distributed mechanism to provide not only distributed access control enforcement but also file (e.g., document) retention. Such distributed access control enforcement ensures the dependability, reliability and scalability of centralized access control management undertaken by the central server for an entire enterprise or a business location.

Figure 11:
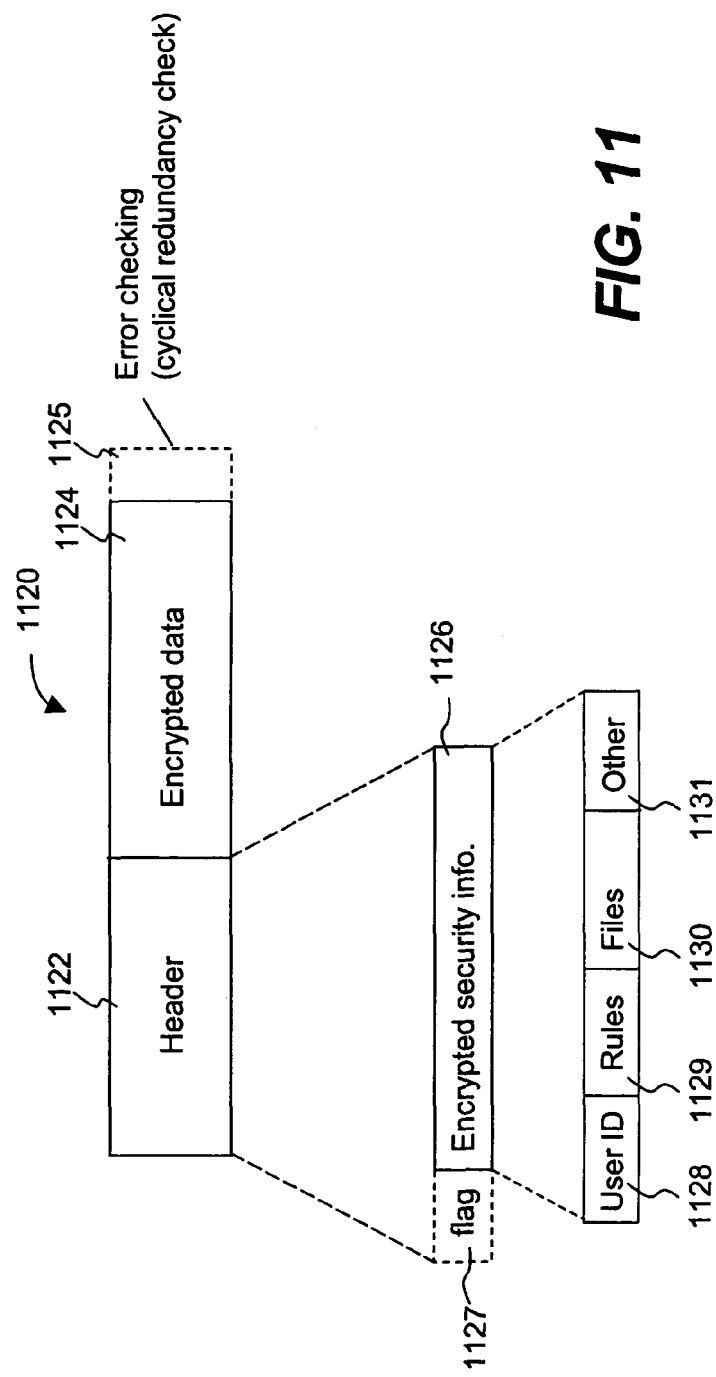
FIG. 11 shows an exemplary data structure of a secured file that may be used in one embodiment of the invention.

FIG. 11 shows an exemplary data structure 1120 of a secured file that may be used in one embodiment of the invention. The data structure 1120 includes two portions: a header (or header portion) 1122 and encrypted data (or an encrypted data portion) 1124. The header 1122 can be generated in accordance with a security template associated with a data store and thus provides restrictive access to the data portion 1124 which, for example, is an encrypted version of a plain file. Optionally, the data structure 1120 may also include an error-checking portion 1125 that stores one or more error-checking codes, for example, a separate error-checking code for each block of encrypted data 1124. These error-checking codes may also be associated with a Cyclical Redundancy Check (CRC) for the header 1122 and/or the encrypted data 1124. The header 1122 includes a flag bit or signature 1127 and security information 1126 that is in accordance with the security template for the data store. According to one embodiment, the security information 1126 is encrypted and can be decrypted with a user key associated with an authenticated user (or requestor).

The security information 1126 can vary depending upon implementation. However, as shown in FIG. 11, the security information 1126 includes a user identifier (ID) 1128, access policy (access rules) 1129, keys (cryptographic keys) 1130, and other information 1131. Although multiple user identifiers may be used, a user identifier 1128 is used to identify a user or a group that is permitted to access the secured file. The access rules 1129 provide restrictive access to the encrypted data portion 1124. The keys 1130 are cipher keys (and/or pointers or indentifiers therefor) that, once obtained, can be used to decrypt the encrypted data portion 1124 and thus, in general, are protected. In one implementation of the data structure 1120, at least one of the keys 1130 is encrypted in conjunction with the access rules 1129. In another implementation of the data structure 1120, at least one of the keys 1130 is a file retention access key or is a key encrypted with a file retention access key, either of which can possibly be further protected by the access rules 1129. The other information 1131 is an additional space for other information to be stored within the security information 1126. For example, the other information 1131 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in various other settings with respect to different combinations, embodiments, implementations or features as provided in the description herein.

The advantages of the invention are numerous. Different embodiments or implementations may yield one or more of the following advantages. One advantage of the invention is that retention of electronic data (e.g., electronic documents) is provided in a robust, cryptographically secure manner. Another advantage of the invention is that retention policies can be based on future events that are unscheduled when assigned to electronic data. Still another advantage of the invention is that the needed cryptographic keys to unsecure secured electronic data are no longer released by a server to a client once a retention policy has expired, thereby effectively and properly disposing of the electronic data.

The foregoing description of embodiments is illustrative of various aspects/embodiments of the present invention. Various modifications to the invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method of electronic document retention, comprising:
    assigning a document retention policy to the electronic document, the document retention policy being based on a future event that is unscheduled;
    cryptographically associating, by encrypting at least a data portion of the electronic document using a cryptographic key, the document retention policy with the electronic document, wherein the cryptographic key is a document retention key or a key encrypted with the document retention key, and wherein the cryptographic key is protected by a document access policy comprising access rules which provide restrictive access to the cryptographic key and the encrypted data portion of the electronic document by deactivating the cryptographic key at a future time; and permitting the deactivating to be overridden so that the electronic document can remain accessible even after a document retention period.

2. The method as recited in claim 1, further comprising:
determining whether the future event has occurred; and
cryptographically preventing access to the electronic document in accordance with the document retention policy based on the future event occurring.

3. The method as recited in claim 2, wherein the determining is performed periodically.

4. The method as recited in claim 2, wherein the determining comprises interacting with a network accessible resource, wherein the network accessible resource is one or more of a server, an application, a client computing device, or a storage device.

5. The method as recited in claim 2, wherein the determining comprises interacting with a web accessible resource, wherein the web accessible resource is one or more of a web server, an application, a client computing device, or an external storage device.

6. The method as recited in claim 5, wherein the determining comprises:
supplying a future event description of the future event to the web accessible resource; and
determining, at the web accessible resource, whether the future event has occurred.

7. The method as recited in claim 6, wherein the supplying is achieved by a universal resource locator associated with the future event description.

8. The method as recited in claim 5, wherein the determining comprises:
supplying the future event description to a contract management system; and
determining, at the contract management system, whether the future event has occurred.

9. The method as recited in claim 1, wherein:
the document retention policy specifies the document retention period based on the future event.

10. The method as recited in claim 9, wherein the document retention policy specifies a document retention period that expires a predetermined period of time after the future event has occurred.

11. The method as recited in claim 9, further comprising:
deactivating the cryptographic key in response to determining that the document retention period has expired, thereby preventing further access to the electronic document.

12. The method, as recited in claim 4, wherein the determining comprises:
supplying a future event description of the future event to the network accessible resource; and
determining, at the network accessible resource, whether the future event has occurred.

13. A computer-implemented method for distributing cryptographic keys used in a file security system, comprising:
receiving, at a computing device, a request for a document retention key that is necessary to gain access to a cryptographically secured electronic document;
identifying, by the computing device, a document retention period having been cryptographically associated with the secured electronic document by encrypting at least a data portion of the secured electronic using the document retention key, the document retention period being dependent on a future event that was unscheduled when the document retention period was associated with the secured electronic document, wherein the document retention key is protected by a document access policy comprising access rules which provide restrictive access to the document retention key and the encrypted data portion of the secured electronic document by deactivating the document retention key at a future time;
determining, by the computing device, whether the document retention period associated with the document retention key has been exceeded; and
refusing to distribute the document retention key in response to determining that the document retention period for the electronic document has been exceeded, except a system administrator is allowed access the document retention key by extending the document retention period or setting a new retention period.

14. The computer-implemented method as recited in claim 13, wherein the document retention period is a predetermined period of time after the future event has occurred.

15. The computer-implemented method as recited in claim 13, wherein the computing device is a server, and wherein the request for the document retention key is from a client module that is connectable to the server via a network.

16. A file security system comprising:
a processor;
a memory having instructions stored thereon, that, in response to execution by the processor, cause the processor to restrict access to electronic files comprising respective encrypted data portions, the instructions comprising:
instructions for storing a plurality of cryptographic key pairs in a key store, each of the cryptographic key pairs including a public key and a private key, at least one of the cryptographic key pairs pertaining to a retention policy, the retention policy being dependent on a future event, wherein the cryptographic key pairs are document retention keys or keys encrypted with a document retention key, and wherein the cryptographic key pairs are protected by a document access policy comprising access rules which provide restrictive access to the cryptographic key pairs and the encrypted data portions of the electronic files by deactivating the private keys at a future time;
instructions for determining whether the private key of the at least one of the cryptographic key pairs pertaining to the retention policy is permitted to be provided to a requestor based on whether the future event has occurred; and
instructions for permitting the private key to be provided to a system administrator even after the future event has occurred,
wherein the requestor requires the private key of the at least one of the cryptographic key pairs pertaining to the retention policy to access a secured electronic file, and wherein the secured electronic file was previously cryptographically associated with the retention policy by encrypting at least a data portion of the secured electronic file using the public key of the at least one of the cryptographic key pairs pertaining to the retention policy, and at the time the electronic file was so secured, the future event was unscheduled.

17. The file security system as recited in claim 16, wherein the instructions for determining comprise instructions for preventing the private key of the at least one of the cryptographic key pairs pertaining to the predetermined time from being provided to the requestor after a predetermined retention period following an occurrence of the future event.

18. The file security system as recited in claim 16, wherein the requestor is a client module that operatively connects to the electronic files over a network.

19. The file security system as recited in claim 16, wherein the file security system further comprises:
   at least one client module configured to assist in selecting the retention policy and secure the electronic file using the public key of the at least one of the cryptographic key pairs pertaining to the retention policy so as to cryptographically impose the retention policy.

20. The file security system as recited in claim 16, wherein the file security system further comprises:
   at least one client module, the client module assisting with unsecuring the secured electronic file by acquiring the private key of the at least one of the cryptographic key pairs that pertains to the retention policy from the key store if permitted, and then unsecuring the secured electronic file using the private key of the at least one of the cryptographic key pairs that pertains to the retention policy.

21. A non-transitory computer readable medium having computer-executable instructions stored thereon for providing data retention for electronic data, the computer-executable instructions comprising:
   instructions to assign a data retention policy to the electronic data, the data retention policy being based on a future event that is unscheduled;
   instructions to cryptographically associate, by using a cryptographic key to encrypt at least a data portion of the electronic data, the data retention policy with the electronic data, wherein the cryptographic key is a document retention key or a key encrypted with the document retention key, and wherein the cryptographic key is protected by a document access policy comprising access rules which provide restrictive access to the cryptographic key and the encrypted data portion of the electronic data by deactivating the cryptographic key at a future time; and
   instructions to permit the deactivating to be overidden so that the electronic document remains accessible even after a document retention period.

22. The computer readable medium as recited in claim 21, wherein the instructions further comprise:
   instructions to cryptographically prevent access to the electronic data in accordance with the data retention policy based on the future event occurring.

23. The computer readable medium as recited in claim 22, wherein the electronic data is an electronic file.

24. The computer readable medium as recited in claim 22, wherein the electronic data is an electronic document.

25. The computer readable medium as recited in claim 21 wherein
   the data retention policy specifies the document retention period based on the future event.

26. The computer readable medium as recited in claim 25 wherein:
   the data retention policy specifies the document retention period expires a predetermined period of time after the future event has occurred, and
   the instructions further comprise:
   instructions to determine whether the document retention period has expired; and
   instructions to deactivate the cryptographic key in response to determining that the data retention period has expired, thereby preventing further access to the electronic data.

\* \* \* \* \*